Figure 1:
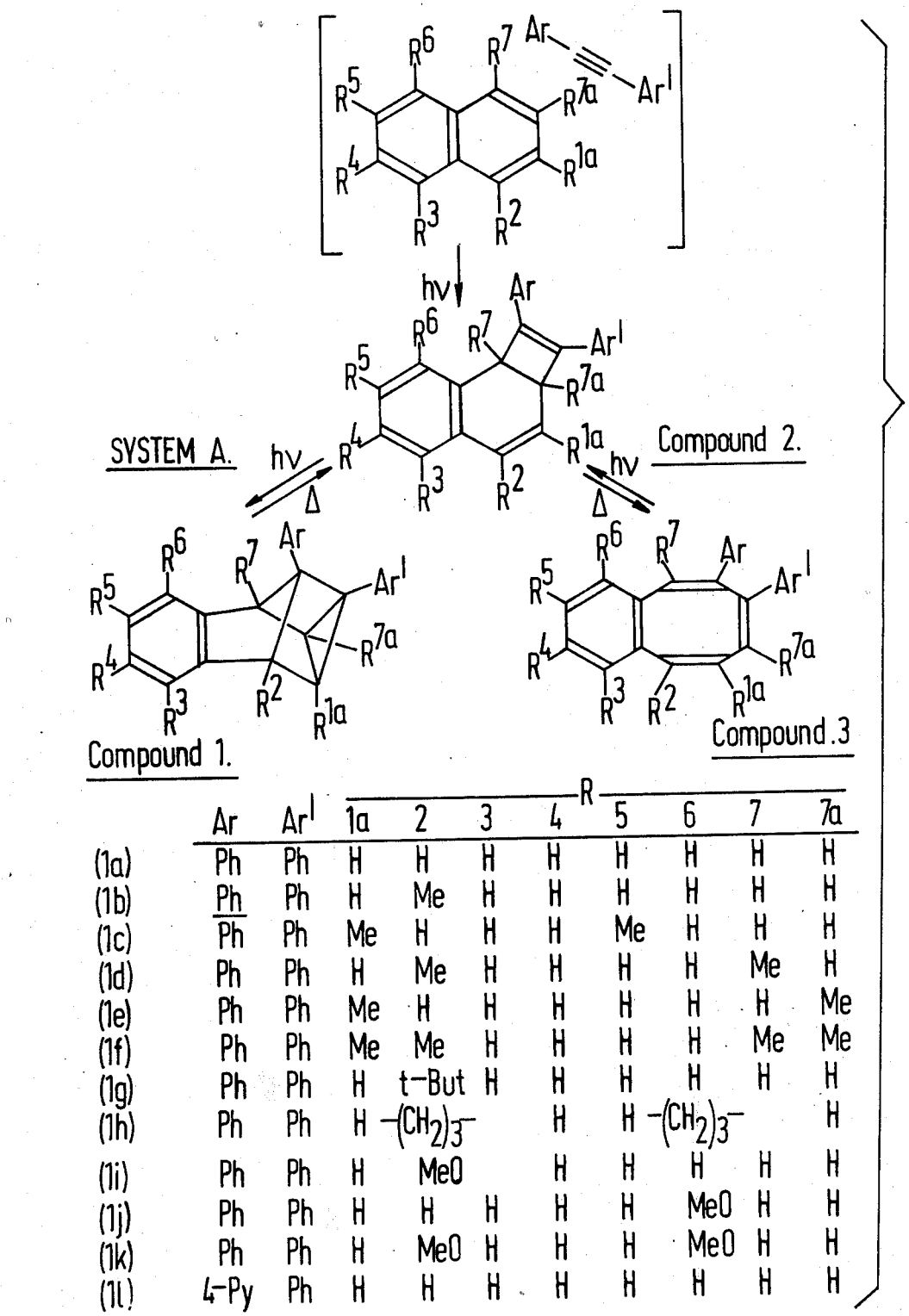

United States Patent [19]

Sasse et al.

[11] 3,994,675

[45] Nov. 30, 1976

[54] CHEMICAL STORAGE OF RADIANT ENERGY

[75] Inventors: Wolfgang Hermann Fritz Sasse, Malvern East; Tsutomu Teitei, Mulgrave, both of Australia

[73] Assignee: Commonwealth Scientific and Industrial Research Organization, Campbell, Australia

[22] Filed: Oct. 7, 1974

[21] Appl. No.: 512,978

[30] Foreign Application Priority Data
Oct. 8, 1973  Australia............................. 5132/73

[52] U.S. Cl..................................... 432/1; 126/263; 126/270; 204/158 R; 237/1 A; 237/1 SL; 237/81; 250/492 R; 252/70; 260/668 A
[51] Int. Cl.[2]........................................... F24J 3/02
[58] Field of Search ................... 252/69, 67, 70, 71, 252/73; 126/263, 270; 250/492 R; 260/668 A, 611 A; 237/1 A, 1 SL, 81; 204/158 R; 432/1

[56] References Cited
OTHER PUBLICATIONS
Daniels, *Biophysical Journal* 12, 723–727 (1972).
Sasse et al., Aust. J. Chem., 24, 2151–2171 (1971).
Marcus et al., Solar Energy, 5, 44–57 (1961).
Heidt et al., "Photochemistry in the Liquid and Solid States," c 1960, John Wiley & Sons, Inc.

*Primary Examiner*—Mayer Weinblatt
*Assistant Examiner*—John D. Smith
*Attorney, Agent, or Firm*—Bacon & Thomas

[57] ABSTRACT

A system for the chemical storage of radiant energy in which either:

A. 1,8-Diaryl-1a,2,7,7a-tetrahydro-1,2,7-metheno-1H-cyclopropa[b]naphthalenes (1) are converted on heating to 1,2-diaryl-2a,8b-dihydrocyclobuta[a]naphthalenes (2) or 8,9-diaryl-benzocyclooctatetraenes (3), with the release of heat; and exposure of either compounds (3) or compounds (2) to suitable radiation results in the photochemical synthesis of compounds (1); or B. Substituted naphthalenes undergo photochemical dimerization to form 1,2,2a,7,8,12b-hexahydro-1,8,2,7-ethanedihylidenedibenzo[a,e]cyclobuta[c]cyclooctenes. On heating, the latter revert to the original naphthalenes with the release of heat.

13 Claims, 2 Drawing Figures

| | Ar | Ar¹ | 1a | 2 | 3 | 4 | 5 | 6 | 7 | 7a |
|---|---|---|---|---|---|---|---|---|---|---|
| (1a) | Ph | Ph | H | H | H | H | H | H | H | H |
| (1b) | Ph | Ph | H | Me | H | H | H | H | H | H |
| (1c) | Ph | Ph | Me | H | H | H | Me | H | H | H |
| (1d) | Ph | Ph | H | Me | H | H | H | H | Me | H |
| (1e) | Ph | Ph | Me | H | H | H | H | H | H | Me |
| (1f) | Ph | Ph | Me | Me | H | H | H | H | Me | Me |
| (1g) | Ph | Ph | H | t-But | H | H | H | H | H | H |
| (1h) | Ph | Ph | H | -(CH₂)₃- | | H | H | -(CH₂)₃- | | H |
| (1i) | Ph | Ph | H | MeO | H | H | H | H | H | H |
| (1j) | Ph | Ph | H | H | H | H | H | MeO | H | H |
| (1k) | Ph | Ph | H | MeO | H | H | H | MeO | H | H |
| (1l) | 4-Py | Ph | H | H | H | H | H | H | H | H |

CHEMICAL STORAGE OF RADIANT ENERGY

This invention relates to systems for the storage of radiant energy, particularly solar radiant energy, and the retrieval of such energy as heat.

Compounds are known which are formed by the absorption of radiative energy and which can be made to decompose to release the stored energy. In a number of publications it has been stated that such compounds could be the key to the utilization of solar energy, provided they satisfied certain criteria. However, no compounds or chemical systems have apparently been found which possess all of these required properties.

A useful system is one of the following type:

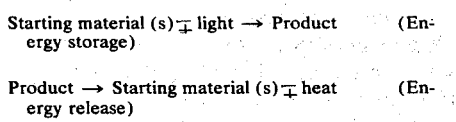

Desirable properties for such a system include:
1. High heat output at elevated temperature. Quantities of 50 – 100 cal/g have been recommended.
2. Efficient absorption of light of the most abundant wavelengths in solar radiation.
3. High quantum and chemical yields in the first and second steps, respectively.
4. Thermal stability of the photochemical product to allow safe storage and transport under all "normal" conditions.
5. Low cost of materials.
6. Reactions should be completely reversible with no side reactions.

Marcus and Wohlers (Solar Energy, 5, 44–57 (1961)) have reported a study of 38 possible systems, of which none were considered satisfactory and only three were rated as "fair."

Figure 2:
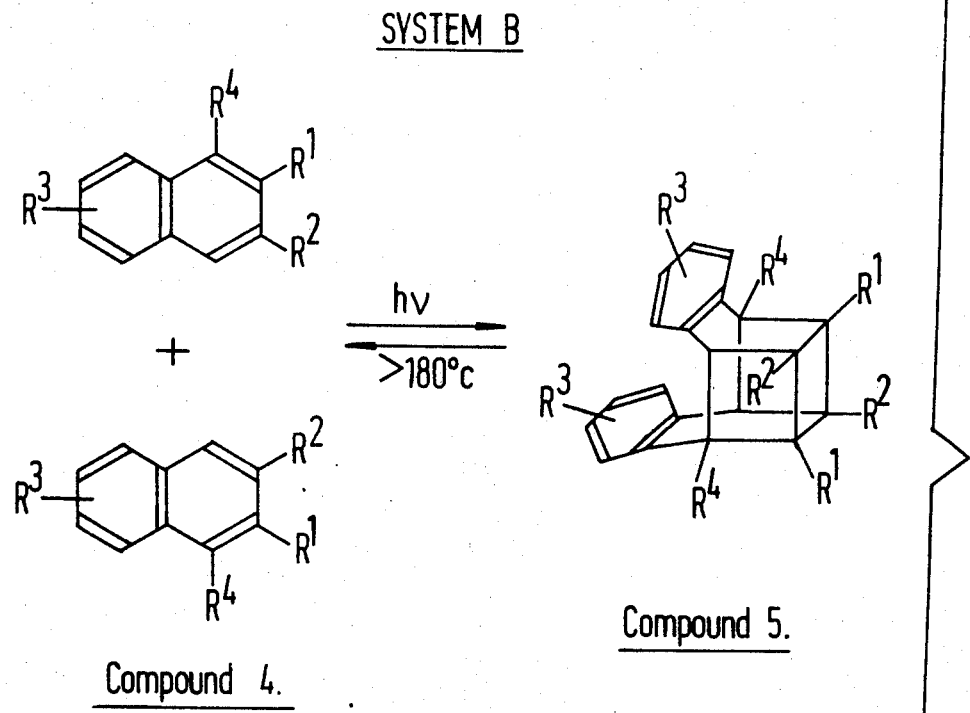

We have now found two photochemical systems, each of which comes close to satisfying the criteria listed above. The two systems (A) and (B) are shown in the accompanying drawing, in FIGS. 1 and 2 respectively.

The two systems are described in more detail as follows:

System A

In this system, compounds (1), i.e. 1,8-diaryl-1a,2,7-,7a-tetrahydro-1,2,7-metheno-1H-cyclopropa[b]naphthalenes are converted on heating to compounds (2), i.e., 1,2-diaryl-2a,8b-dihydrocyclobuta[a]naphthalenes with the release of heat. With certain compounds, a further reaction stage can occur to form compounds (3), i.e., 8,9-diarylbenzocyclooctatetraenes, with the release of further heat. Exposure of either compounds (3) or compounds (2) to suitable radiation results in the photochemical synthesis of compounds (1).

The compounds (1) with which the invention is particularly concerned are those in which each of the groups $R^{1a}$, $R^2$, $R^3$, $R^4$, $R^5$, $R^6$, $R^7$ and $R^{7a}$ is hydrogen, alkyl up to $C_4$, aryl, alkoxy, fluoro, chloro, cyano or an alkyl ester group (COOR) where R is lower alkyl, and wherein $R^6$ and $R^7$ together or $R^2$ and $R^3$ together may form a saturated ring, provided that only hydrogen, fluoro and alkyl groups may be present in more than two positions, and each of the groups $Ar$ and $Ar^1$ is phenyl or pyridyl.

The most convenient and practical way to prepare one of the compounds of the system is by the reaction shown in brackets in the drawing where the appropriately substituted naphthalene is reacted photochemically with a diarylacetylene to form the compound (1) via a cyclobutanaphthalene (compound (2)), i.e., as described by W. H. F. Sasse, P. J. Collin, D. B. Roberts and G. Sugowdz, in Aust. J. Chem., 1971, 24 2151–71.

System B

This is a simpler system involving the photochemical dimerization of two naphthalenes (formula 4) to form 1,2,2a, 7,8,12b-hexahydro-1,8,2,7-ethanediylidenedibenzo [a,e] cyclobuta[c] cyclooctenes of formula (5). On heating, the latter revert to the original naphthalenes with the release of heat.

Although most of the substituted naphthalenes described below will dimerize, the reaction is usually much more favourable between two differently substituted naphthalenes. The formation of different combinations, when two naphthalenes are present, does not affect the operation of the system since the original starting material will be obtained from the thermal decomposition.

The naphthalenes which are suitable for this system are those in which
$R^{3'}$ is hydrogen, an alkoxy group (up to C3) or an ester (COOR', where R' is methyl, ethyl or propyl), each of $R^{1'}$, $R^{2'}$ and $R^{4'}$ is hydrogen, alkoxy (up to C3), ester (COOR' where R' is methyl, ethyl or propyl), nitrile, alkyl (up to C4), fluoro or chloro provided that one or two of the groups $R^{1'}$ to $R^{4'}$ is hydrogen.

Also suitable are the anhydrides of the corresponding naphthoic acids i.e. in which the two naphthalene groups needed for the dimerization are built into one molecule.

Thus, in accordance with one aspect of the present invention, there is provided a system for the storage of radiant energy and the retrieval of such energy as heat, wherein a compound of formula (1) as defined above is produced by exposing the appropriately substituted compound of formula (2) or formula (3) to the said radiant energy, and when it is desired to retrieve the energy, the compound (1) is heated to release the energy as heat.

In another aspect, the invention provides a system for the storage of radiant energy, wherein a compound of formula (4) as defined above is exposed to the said radiant energy to form a compound of formula (5) and when it is desired to retrieve the energy, the compound (5) is heated to release the energy as heat.

The procedures involved in performance of the invention are described in more detail as follows.

In using the defined compounds for the storage and retrieval of energy, two sets of reaction conditions are involved. These are dealt with separately below.

a. Absorption of Energy

This procedure essentially involves exposing a solution of the previously decomposed material (formula (2) or (3) system (A) and formula (4) in system B) to suitable radiation for a length of time which will give sufficient conversion for the system to operate economically.

Solvents

These are chosen so as to provide desirable solubility properties for both the starting materials and the end products. It is possible to select solvents from which the end product precipitates, if this is desired, or in which the end product is soluble. In general, low viscosity hydrocarbons (used singly or in mixtures such as petroleum fractions) are suitable, as are aromatic solvents. Typically, one can use straight and branched-chain saturated aliphatic hydrocarbons, alicyclic hydrocarbons, benzene and alkyl substituted benzenes. Cyclohexane and benzene are preferred. Solvents which inhibit photochemical reactions or which are decomposed by radiation are obviously not suitable.

Temperature

Temperature is generally not critical in the reaction of system A and the rates yield of the reaction with the compounds (2) do not vary over (at least) the range 10° to 75° C. For system B, however, it is desirable, where practicable, to keep the temperature low, say less than about 25° C. Yields tend in system B to be lower at higher temperatures, particularly above about 50° C.

Wavelength of Radiation

In general, the reactions take place under radiation having wavelengths between about 300 and 400 nanometers. In some circumstances using selected sensitizers, the range can be extended further into the visible (long wavelength) region. On the other hand, shorter wavelength radiation tends to decompose the materials. Solar radiation is well suited and obviously preferred for the process but, alternatively, any artifical light source emitting significant amounts of radiation above 300 nanometers is suitable.

Although the reaction proceeds readily without the use of sensitizers, in some cases such materials can be useful. These compounds are well known for their ability to absorb radiant energy and transfer it to the substrate, thus providing more efficient utilization of the radiation. Useful compounds of this type which can be useful in these reactions absorb between 360 and ca. 450 nm.

The compounds of structure (2) (system A) react even on overcast days (June–July, Melbourne), although, of course, the rate in bright sun light is greater. The compounds of system B need sunny weather for satisfactory reaction.

Time of Reaction

As in normal photochemical reactions, the rate of reaction depends on the intensity of the radiation of the appropriate wavelength, the geometry of the reaction container and its relationship to the light source, and the concentration of reactant in the solution. The reaction time will therefore depend on the particular arrangement of these factors and can be varied within a fairly wide range. For efficiency of continuous operation, it is usually better to permit only partial conversion of the starting materials, which allows short reaction times of the order of minutes or less. For batch type operation, it is often better to take the reaction nearer to completion.

Degassing

The reaction should be carried out in the absence of oxygen in order to avoid inhibition of the photochemical reaction, as well as decomposition of the starting and final materials. This is achieved by suitable degassing at the start of the reaction together with the use of nitrogen or other chemically and photochemically inert gas. Ideally the process of storing and recovery of energy is carried out in a totally sealed system so that oxygen-free conditions are readily maintained. However, while degassing is desirable, system B in particular is not very sensitive to oxygen and mere displacement of air by nitrogen is sufficient.

b. Decomposition Reaction

This reaction can be carried out either on the isolated, solid reaction products from the above absorption reaction in a sealed air-free system, or alternatively the material may be treated in solution or in suspension in a liquid medium. Reaction does not occur below about 180° C, and usually the onset of evolution of heat begins between 180°–200° C. The reaction is usually rapid, being complete in a matter of seconds. Concentration and other system parameters can be adjusted to achieve a suitably large temperature rise in order to obtain a good thermodynamic efficiency.

We have established that on extended exposure to high temperatures structures (2) and (3) (system A) undergo changes that are not reversible on irradiation. These changes can be exothermic and occur in fact under certain conditions in the D.S.C. measurements reported hereinafter. This phenomenon limits the quantities of useful heat available from these compounds. In the examples, the quoted temperatures are those at which decomposition was not observed on exposure for 10 minutes.

No such problems arise in the compounds used in system B; the temperatures quoted in the examples are far below the limits of thermal stability.

It will be appreciated that many working systems may be devised and used to utilize the energy-storing properties of the materials of the invention.

In the simplest of such systems, a solution of the starting material is exposed to the sun or other radiation source and the product of the reaction isolated. The stored energy can be made available whenever required by introducing the material into a heated zone, when the decomposition would release heat to the surroundings.

In more sophisticated systems, continuous or semi-continuous processing can be performed, wherein the solution of starting material is exposed in batches, or in continuous flow, to radiation and the solution passed continuously or periodically into storage and subsequently into a heat recovery system wherein the solution is introduced into a hot zone and thence to a heat exchanger so that the released heat was collected. Alternatively, the storage may be dispersed with and the heat recovered immediately after irradiation. The spent solution can be returned to ambient temperature, with recovery of residual heat, and then re-irradiated. The recovery of the released heat can be achieved in some systems by allowing the solvent to reflux thus taking off the heat as latent heat which is recovered in a suitable condenser.

It is difficult to obtain exact data on the energy storage of the compounds. Estimates made from experiments in which the heat decomposition was carried out in a differential thermal analyzer indicate that the naphthalenes of system B give out amounts of something more than 120 calories/g while the methenocyclopropanaphthalenes of system A give out in excess of 50 calories/g. This is comparable with the quantities of 50–100 cals/g suggested in the literature as being necessary for a radiant energy storage system (Farrington Daniels, *Biophysical J.* 12 723–7 (1972)).

The Examples which follow show the variation of temperatures needed to observe heat release for different compounds. It should be noted that these temperatures are dependent on the rate of heating; all figures given in the Examples refer to one rate (10°/min). However, the amount of heat released will not vary significantly with the rate of heating only the onset of detectable heat release. Thus, rapid heating of, say compound (1a), to any temperature in the upper half of the range 200° to 260° will release ca. 75 cal/g at that temperature. The D.S.C. measurements could only be performed with the specially constructed containers described and there is thus uncertainty about the absolute magnitude of the heat released. The values given in the Examples are thus conservative and may represent less than 1/6th of the predicted values.

The materials and methods of this invention thus satisfy the defined criteria for workable radiant energy storage systems. The compounds concerned are stable and fairly readily prepared; they absorb radiation in the visible region of the spectrum and react readily under solar radiation; the chemical yields are essentially quantitative and the reactions completely reversible so that continued recycling will lead to only exceedingly slow dissipation of material into unwanted by-products. The heat is released at practical temperatures in quantities suitable for practical working. The conditions for releasing the stored energy are considerably different from those to produce the photochemical product so that no loss of energy through back reaction occurs. The reaction products are very stable and can be stored indefinitely and then the heat can be recovered without loss due to degradation or decomposition.

The invention is further described and elucidated by the following examples, which, however, should not be construed as limiting the invention in any way.

It should be noted that the rates and yields of a given reaction depend on the access of sunlight and hence the ratio surface area/volume is important. This can be varied in many ways. All experiments described herein are based on the use of "Pyrex" (Registered Trade Mark) test tubes but more efficient conversions can occur in reactors with large flat walls and small volumes. Other influencing factors include the use of stirring and of reflectors behind and below the reactor.

The compounds (1a), (1b) etc. and (5a) (5b) etc. referred to in the examples are identified in the Tables which appear in the drawings. The compounds (2a), (2b) etc. and (4a), (4b) etc. have the same substituents as (1a), (1b) etc. and (5a), (5b) etc. respectively.

EXAMPLES OF PHOTOCHEMICAL REACTIONS

I. A degassed solution of compound (2a) (10%) in benzene was placed in a Pyrex test tube which was then placed out of doors in a position free of shadows. After exposure for 10 hours (overcast sky, no rain, June, Melbourne) resulted in 60% conversion to compound (1a). After 48 hours continuous exposure, conversion was complete. The product was isolated by evaporation of the solvent.

III. Example (I) was repeated under sunny conditions when compound (1a) was obtained in 50% yield after 4½ hours.

III. Further repetitions of Examples (II) and (III) at varying temperatures, the rate of conversion of compound (2a) to compound (1a) was not significantly affected by varying the temperature between 10° and 75°.

IV. Compound (2i) was irradiated under the conditions described in Example (I) to give compound (1i) in comparable yield.

V. Compound (2h) was irradiated under the conditions described in Example (I) to give (1h) in 60% conversion after 8 hours.

VI. Compound (2a) was irradiated in mesitylene as described under (I) to give compound (1a) at the same rate as in Example (I).

VII. Compound (2a) was irradiated in 1-methylnaphthalene as described in Example (I) to give compound (1a) at the same rate as in Example (I).

VIII. Compound (2a) was irradiated in o-dichlorobenzene as described in Example (I) to give compound (1a) at the same rate as in Example (I).

IX. A degassed solution of methyl 3-methoxynaphthalene-2-carboxylate (3g) in methanol (10 ml) was exposed to sunlight in a round-bottom flask. After 1 week the dimer, compound (5e), separated as colourless crystls (40%). After addition of more starting material the irradiation was resumed to give the dimer in comparable yield.

X. Experiment (IX) was repeated in benzene when the dimer (5e) formed in similar yield but was not precipitated. It was isolated by chromatography on alumina (elution with 10% ethanol in chloroform).

XI. Experiment (IX) was repeated and continued for 4 weeks to give the dimer (5e) in (65% yield).

XII. A 50% solution of ethyl 2-carboxynaphthalene in ethanol was exposed for 4 weeks to give the dimer (5b) in 35% yield.

XIII. A 25% solution of 2-cyanonaphthalene in benzene was exposed for 4 weeks to give the dimer (5d) in 20% yield.

EXAMPLES OF DECOMPOSITION REACTIONS

(Release of Heat)

These experiments were carried out using a differential scanning calorimeter (see below). Weighed samples of the photoproducts (neat or in the presence of solvents) were introduced into a specially constructed aluminium cylinder which was designed to facilitate heat transfer to the instrument while withstanding the pressure generated. The loaded cylinder was then heated while heat losses and gains, temperature, and weight were monitored. After completion the samples were recovered and examined by gas-liquid chromatography, thin-layer chromatography, and proton magnetic resonance spectroscopy. The results are outlined in Table 1.

The compounds based on the system A were converted to their isomeric 1,2-diaryl-2a,8b-dihydrocyclobuta[a] naphthalenes (2), or in some cases, to mixtures of (2) and the cyclooctatetraenes (3). Compounds of structure (2) and (3) in general undergo further exothermic changes above the temperatures indicated in column 4 in table but these changes are not photochemically reversible and were therefore avoided by working below the temperatures indicates in column 4. No evidence for any photochemically irreversible thermal decomposition was observed with monomeric naphthalenes formed from the photodimers (5) temperatures shown in column (4) but these compounds are known to be thermally stable well above the temperatures used.

All experiments were carried out with a RigakuDenki combined differential scanning calorimeter and thermogravimetric analyser (cat. no. 8087). The samples were introduced into an aluminium cylinder (internal diameter 4 mm; external dia. 5 mm; height 6 mm) which was threaded at the top and closed by an internally threaded aluminium lid with a teflon gasket. Loss of mass due to sublimation/evaporation were not observed. The thermal measurements were reproducible to within 10% but no corrections were made for heats of evaporation, solution, and fusion. Each of these factors would presumably lower the observed exotherms.

TABLE 1

| Compound | Differential Scanning Calorimetry | | Thermal Stability[c] |
|---|---|---|---|
| | Temperature range of Exotherm[a] | Heat evolved[b] cal/g | |
| (1a) | 200 – 260 | 75 | 260° |
| (1a)[d] | 196 – 268° | 55[d] | 260° |
| (1b) | 170 – 250° | 73 | 260° |
| (1c) | 190 – 260° | 80 | 265° |
| (1d) | 180 – 260 | 55 | 300° |
| (1e) | 224 – 290° | 53 | 300° |
| (1f) | 240 – 335° | 45 | 325° |
| (1g) | 150 – 221° | 47 | 220° |
| (1h) | 100 – 200° | 67 | 280° |
| (1i) | 130 – 203° | 80 | 240° |
| (1j) | 190 – 275° | 55 | 285° |
| (1k) | 150 – 213° | 70 | 250° |
| (1l) | 200 – 260° | 58 | 260° |
| (5a) | 190 – 300° | 120 | 325° |
| (5b) | 190 – 270° | 120 | 325° |
| (5c)[d] | 184 – 253° | 110 | 325° |
| (5d) | 170 – 260° | 114 | 325° |
| (5e) | 180 – 240° | 82 | 300° |
| (5f) | 114 – 160° | 85 | 300° |

[a]Onset and end of exotherm at 10°/min.
[b]Not corrected for heats of evaporation, solubilities, etc.
[c]No change detected at this temperature after 10 min. by gas chromatography: 30 cm OV-101 (5%) on chromosorb W programmed from 150° to 250° at 8°/min.
[d]Experiment in benzophenone as solvent.
[e]Liquid sample.

The claims defining the invention are as follows:
1. A process for generating heat which comprises exposing a compound of the formula

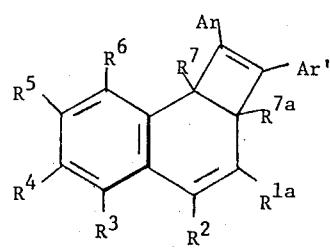

COMPOUND 2 or mixtures thereof to sufficient radiant energy to produce a compound of the formula

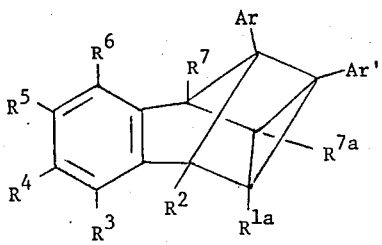

COMPOUND 1 and heating said produced compound 1 to a sufficient temperature to produce said compounds 2,3 or mixtures thereof with the release of energy as heat; wherein in the compounds 1, 2 and 3, each of the groups $R^{1a}$ and $R^{7a}$ is hydrogen or fluorine or a lower alkyl group or a lower alkyl ester group; each of the groups $R^2$ and $R^7$ is hydrogen, fluorine or chlorine, or a lower alkyl, lower alkoxy, aryl, cyano or lower alkyl ester group; each of the groups $R^3$ and $R^6$ is hydrogen or fluorine or a lower alkyl, lower alkoxy, or lower alkyl ester group; each of the groups $R^4$ and $R^5$ is hydrogen or a lower alkyl group; and wherein $R^6$ and $R^7$ together or $R^2$ and $R^3$ together may form a saturated alkylene chain; provided that only hydrogen and lower alkyl groups may be present in more than two positions; and each of the groups Ar and Ar' is phenyl or 4-pyridyl.

2. A process as claimed in claim 1, wherein in the exposure to radiant energy and/or heating steps the compounds are dissolved in a solvent.

3. A process as claimed in claim 2, wherein the solvent is cyclohexane or benzene.

4. A process as claimed in claim 1 wherein the radiant energy is derived from light of a wave length between about 300 and 400 nm.

5. A process as claimed in claim 1 wherein the radiant energy is derived from solar radiation.

6. A process as claimed in claim 1 wherein exposure to radiant energy is conducted in the presence of a sensitizer which absorbs radiant energy with wave lengths in the range of 360 to 450 nm.

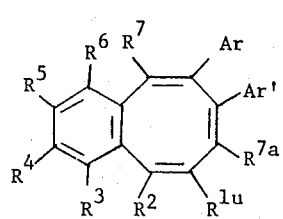

COMPOUND 3

7. A process as claimed in claim 1, wherein the radiant/energy is carried out in the substantial absence of oxygen.

8. A process as claimed in claim 1, wherein the compound (1) is heated to a temperature of at least 180° C.

9. The process of claim 1 wherein $R^{1a}$ is hydrogen or methyl; $R^2$ is hydrogen or a methoxy group or a methyl or a tert-butyl group; $R^3$ is hydrogen; or $R^2$ and $R^3$ together form a 1,3-propylene group; $R^4$ is hydrogen; $R^5$ is hydrogen or a methyl group; $R^6$ is hydrogen or a methoxy group; $R^7$ is hydrogen or a methyl group; or $R^6$ and $R^7$ together form a 1,3-propylene group; $R^7$ is hydrogen or a methyl group; and each of the groups Ar and Ar' is phenyl or 4-pyridyl.

10. The process of claim 1 wherein Ar and Ar' are phenyl, and each of $R^{1a}$, $R^2$, $R^3$, $R^4$, $R^5$, $R^6$, $R^7$ and $R^{7a}$ is hydrogen.

11. The process of claim 1 wherein Ar and Ar' are phenyl, $R^{1a}$, $R^3$, $R^4$, $R^5$, $R^6$ and $R^{7a}$ are hydrogen, and $R^2$ and $R^7$ are methyl.

12. The process of claim 1 wherein Ar and Ar' are phenyl, $R^2$ is methoxy and $R^{1a}$, $R^3$, $R^4$, $R^5$, $R^6$, $R^7$ and $R^{7a}$ are hydrogen.

13. The process of claim 1 wherein Ar and Ar' are phenyl, $R^{1a}$, $R^3$, $R^4$, $R^5$, $R^7$ and $R^{7a}$ are hydrogen, and $R^2$ and $R^6$ are methoxy.

* * * * *